United States Patent [19]

Fortune

[11] Patent Number: 4,971,216
[45] Date of Patent: Nov. 20, 1990

[54] DISPOSABLE COOKING UTENSIL

[75] Inventor: Patrick J. Fortune, Lake Forest, Ill.

[73] Assignee: Packaging Corporation of America, Evanston, Ill.

[21] Appl. No.: 427,014

[22] Filed: Oct. 25, 1989

[51] Int. Cl.$^5$ ............................................... B65D 90/00
[52] U.S. Cl. ............................. 220/94 R; 220/89 H; 220/19; 220/71; 229/3.5 MF
[58] Field of Search ............... 220/85 H, 94 R, 95, 220/71, 72.1, 73, 401, 19; 229/3.5 MF

[56] References Cited

U.S. PATENT DOCUMENTS

| | | | |
|---|---|---|---|
| 983,473 | 2/1911 | Barnes | 220/85 H |
| 1,950,376 | 3/1934 | Alexander | 220/95 |
| 4,717,038 | 1/1988 | Anders | 220/71 X |
| 4,817,812 | 4/1989 | Sarnoff et al. | 220/85 H |
| 4,852,760 | 8/1989 | Sarnoff et al. | 220/85 H |

Primary Examiner—Steven M. Pollard
Attorney, Agent, or Firm—Neuman, Williams, Anderson & Olson

[57] ABSTRACT

A disposable cooking utensil is provided which comprises a metal foil pan and a handle assembly therefor. The pan includes a bottom panel, an upright side wall encompassing the periphery of the bottom panel and being connected thereto, and a rim connected to an upper edge of the side wall and extending laterally outwardly therefrom. A reinforcing bead encompasses the outer periphery of the rim. The handle assembly includes a first section and a transverse second section connected thereto. The first section has an elongate base subtending and supporting the pan bottom panel and side segments connected to opposite ends of the base and extending upwardly therefrom. The side segments are in proximity to first exterior portions of the pan side wall. Each side segment is provided with a handle which is adjacent the pan reinforcing bead and extends upwardly therefrom. The handle assembly second segment includes an elongate first member subtending and supporting the pan bottom panel and disposed transversely of and connected to the first section base. Second members are connected to opposite ends of the first member and extend upwardly therefrom and are in proximity to second exterior portions of the pan side wall. Each second member has an upper end portion which extends through an opening formed in the pan rim. Each upper end portion above the pan rim is offset outwardly away from the side wall upper edge into hooking engagement with the pan reinforcing bead.

9 Claims, 1 Drawing Sheet

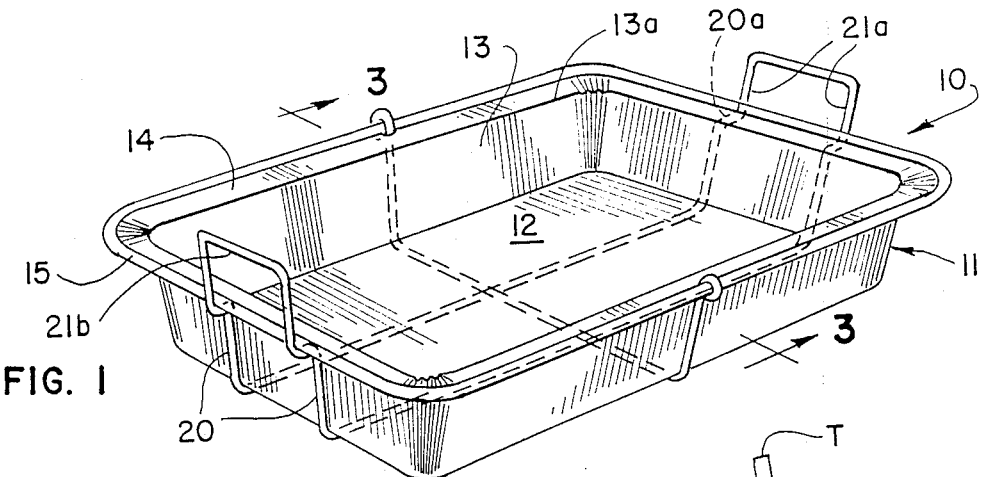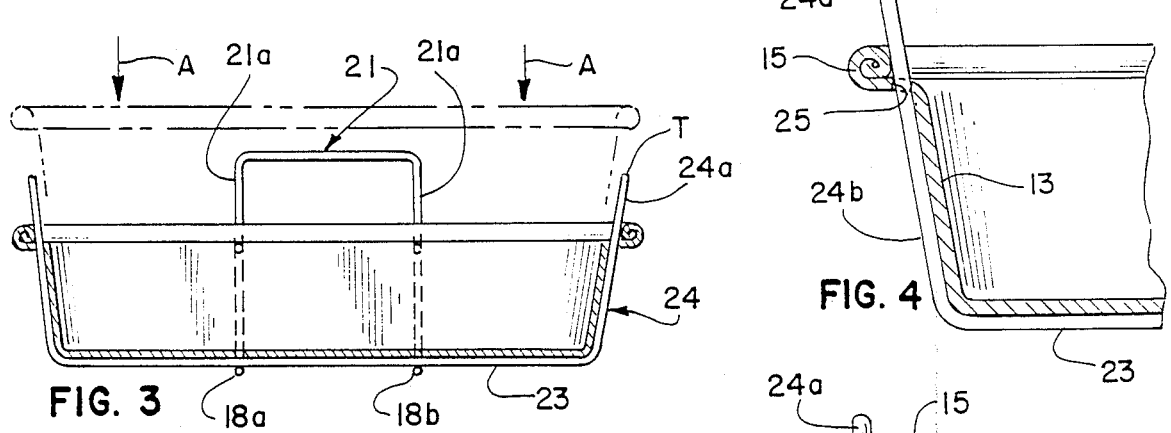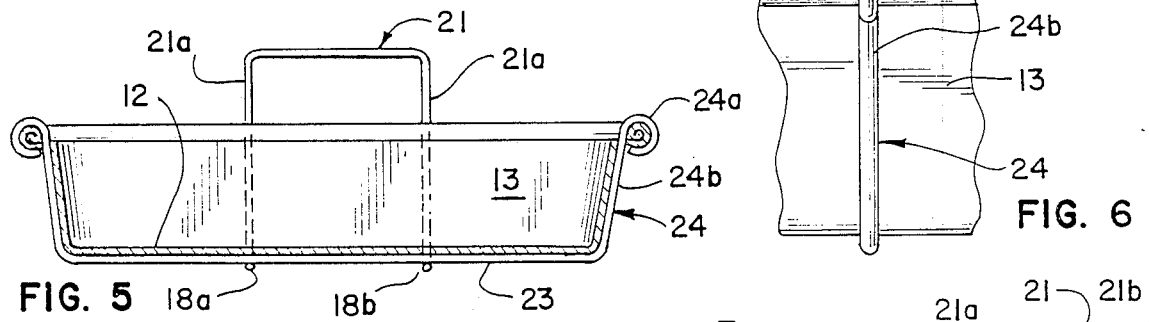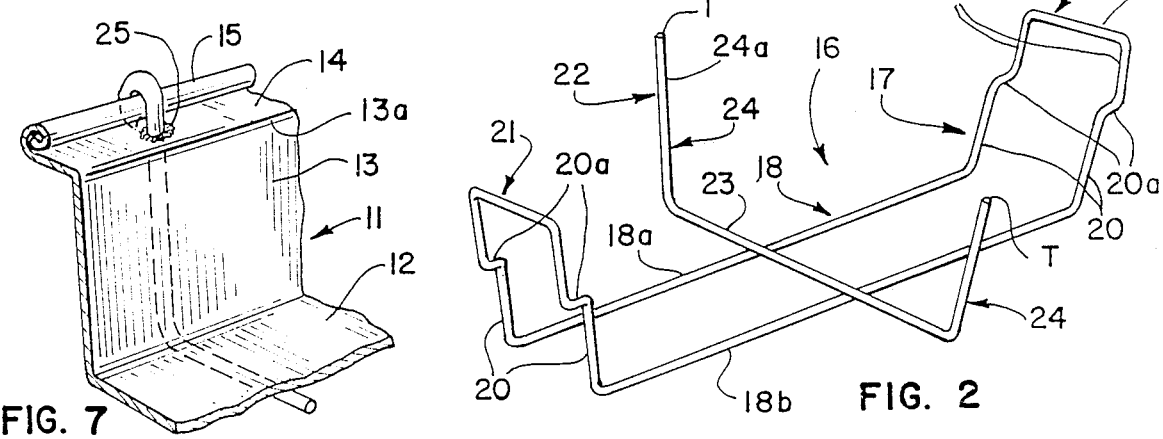

DISPOSABLE COOKING UTENSIL

BACKGROUND OF THE INVENTION

The use of disposable metal foil pans for cooking various food products such as turkeys, roasts, hams and the like has become popular in recent years. The advantages of such a pan are (a) it is inexpensive; (b) eliminates the need for cleaning the pan after use; and (c) is of simple, lightweight and sturdy construction. Notwithstanding these advantages, such pans are also beset with disadvantages as well. For example, when the product accommodated by the pan is bulky and heavy, manual handling of a loaded pan requires care, otherwise the pan will buckle and distort causing the product to become unstable and fall out of the pan, or the juices exuded from the product to spill out of the pan. Also, it is awkward and sometimes hazardous to lift the pan by grasping the rim thereof when placing the loaded pan into or removing same from an oven.

Various handles or handle assemblies have heretofore been proposed to facilitate manual handling of such pans. Such prior handles or handle assemblies, however, have one or more of the following undesirable inherent design characteristics: (i) they are of costly and complex construction; (ii) they are bulky and thus, when permanently affixed to the pan, substantially increased the overall peripheral dimension the pan thereby restricting the use thereof to ovens having large cooking chambers and (iii) affixing the handle or handle assembly to the pan is an awkward and time consuming manufacturing operation.

Examples of various prior handles or handle assemblies are disclosed in Anders Pat. No. 4,717,038 and Sarnoff et al. Pat. Nos. 4,817,812 and 4,852,760. In the Anders structure, an inordinate number of components are required which in turn, complicate the procedure for attaching the handle assembly to the pan rim. In the Sarnoff et al. Pat. No. 4,817,812, the handle assembly is not attached to the pan and thus, the loaded pan may inadvertently or accidentally become disassembled from the handle assembly during handling. Furthermore, the frame assembly does not extend upwardly the full height of the pan side wall and thus, in certain instances would not provide stable support for the loaded pan particularly when the pan is being manually transported. The Sarnoff et al. Pat. No. 4,852,760 discloses a handle assembly wherein a frame section thereof has the opposite upper ends thereof preformed into a complex shape requiring a costly wire bending fixture used in manufacturing the frame assembly. Furthermore, because of the preformed configuration of the upper ends, care must be exercised by production personnel in manually targeting and inserting opposed rim segments of the pan into the open sides of the preformed end portions. Once the rim segments are in place the upper end portions are crimped to the rim. Such targeting manipulation is fatiguing and requires personnel which is alert and disciplined.

SUMMARY OF THE INVENTION

Thus, an improved disposable cooking utensil has been provided which avoids the shortcomings besetting prior utensils of this general type.

The improved cooking utensil is of simple design and requires a minimum number of component parts.

The improved cooking utensil may be readily assembled with a minimum amount of manual effort.

The improved cooking utensil incorporates a handle assembly which does not enlarge the overall peripheral dimension of the utensil to such an extent that it occupies an inordinate amount of space for cooking or storage.

The location of the handles in the improved cooking utensil facilitates handling the loaded pan when being placed into or removed from an oven.

Further and additional advantages of the improved cooking utensil will become apparent from the description, accompanying drawings and appended claims.

In accordance with one embodiment of the invention a disposable cooking utensil is provided which includes a pan preferably of a thin gauge metal foil material and sized to accommodate various food products such as turkeys, roasts, hams and the like, and a handle assembly connected to and supporting the pan. The pan includes a bottom panel upon which the food product is placed, and an encompassing side wall which extends upwardly from the periphery of the bottom panel. A rim extends laterally outwardly from the upper edge of the side wall. The outer edge of the rim is encompassed by a reinforcing bead. The handle assembly is preferably formed of wire and includes a first section having a elongate base which subtends and supports the pan bottom panel and spans the bottom panel in one direction. The first section also includes side segments which extend upwardly from opposite ends of the base and are in close proximity to the exterior surface of the pan side wall. A handle is connected to the upper end portion of each side segment. The handle is disposed adjacent the pan reinforcing bead and extends upwardly therefrom. The handle assembly is provided with a second section which is disposed substantially transverse to the first section and is connected thereto. The second section includes an elongate first member which subtends and supports the pan bottom panel and spans the bottom panel in a second direction. Connected to opposite ends of the first member are upwardly extending second members which are in close proximity to the exterior surface of the pan side wall. Each second member has an upper portion which extends through an opening formed in the pan rim. A segment of the upper portion disposed above the rim opening is offset outwardly away from the upper edge of the pan side wall and is in hooking engagement with a portion of the pan reinforcing bead.

DESCRIPTION

For a more complete understanding of the invention reference is made to the drawings, wherein:

FIG. 1 is a perspective top view of a preferred embodiment of the improved disposable cooking utensil;

FIG. 2 is a perspective top view of the handle assembly per se shown in FIG. 1 and prior to being attached to the pan.

FIG. 3 is a sectional view taken along line 3—3 of FIG. 1 prior to the handle assembly being fixedly attached to the pan; the pan, shown in phantom lines, is disposed above and in vertical alignment with the handle assembly and prior to being moved downwardly relative thereto whereby the upper portions of the second members of the second section of the handle assembly extend through openings formed in the pan rim.

FIG. 4 is an enlarged fragmentary view of a portion of FIG. 3 showing one of the second members extending through a pan rim opening.

FIG. 5 is like FIG. 3 but showing the handles assembly affixed to the reinforcing bead of the pan.

FIG. 6 is an enlarged fragmentary side elevational view of the utensil of FIG. 1 showing one second member of the second section in hooking engagement with the pan reinforcing bead.

FIG. 7 is an enlarged fragmentary perspective view similar to FIG. 6 but looking outwardly from the interior of the utensil.

Referring now to the drawings and more particularly to FIG. 1, a preferred embodiment of the improved disposable cooking utensil 10 is shown which is suitable for cooking various food products such as turkeys, roasts, hams and the like in conventional gas or electric ovens. The utensil includes a pan 11 formed of thin gauge sheet material such as aluminum foil. The pan may be of the type disclosed in U.S. Pat. No. 4,616,762 issued Oct. 14, 1986. Basically the pan 11 includes a bottom panel 12 which may have a rectangular, square, polygonal, oval or round shape. The shape of the bottom panel will be determined by the shape and size of the food product to be cooked. While the bottom panel is shown as planar, it may have formed therein a plurality of stiffening ribs or protuberances. Integral with and encompassing the periphery of the bottom panel and extending upwardly therefrom is a continuous side wall 13. The side wall diverges outwardly a slight amount from the bottom panel, as seen in FIGS. 3 and 5.

Extending laterally outwardly from and encompassing the upper edge 13a of the side wall 13 is a rim 14. Encompassing the outer periphery of rim 14 is a reinforcing bead 15. The bead may be formed by curling or rolling inwardly the outer edge of the rim. As seen in FIG. 7, the bead 15 is spaced outwardly from the upper edge 13a of the side wall.

The utensil 10 also includes a handle assembly 16 which is preferably formed of bent metal wire which is capable of withstanding high cooking temperatures (e.g. 500° F.) for an extended period of time involving many hours without altering its shape and stiffness. The cooking temperature and time will depend upon the food product being cooked. As seen in FIG. 2, the handle assembly 16 is of skeletal configuration and includes a first section 17 having a base 18 which subtends, supports and spans in one direction the bottom panel 12 of the pan 11. The base is preferably formed of a pair of elongate rectilinear wire segments 18a and 18b which are disposed in spaced parallel relation. Connected to opposite ends of the base 18 are second segments 20. Each segment 20 extends upwardly along the exterior surface of the pan side wall 13 and conforms substantially to the vertical slant of the side wall. The upper end 20a of each segment 20 is offset outwardly and supportingly engages the underside of the pan rim 14, see FIG. 1. The outer, or distal, ends of the offset upper ends 20a are connected to upstanding handles 21, each of which has preferably an inverted U-shape. Each handle 21 has depending legs 21a which are connected to corresponding offset ends 20a. The handle also includes a bail portion 21b which interconnects the upper ends of the legs 21a. The handles 21, as seen in FIG. 1 extend upwardly and slightly outwardly from the pan bead and may be readily grasped without coming into contact with the food product, not shown, accommodated in the pan 11. Furthermore, the handles may diverge outwardly a small amount (3°-5°) from the bead and thus, the overall peripheral dimension of the utensil is changed an insignificant amount. The first section 17 of the assembly 16 may be formed of one or more pieces of wire. Where a single piece of wire is utilized, the ends of the piece may be welded or fused together in either side by side, or abutting end to end relation. In the alternative, the first section 17 may be formed of two interconnected parts of like configuration. Each part includes a inverted U-shape handle 21, a pair of corresponding side segments 20 and wire segments 18a and 18b spanning in one direction approximately one half of the pan bottom panel 12. The corresponding wire segments of the two parts are welded or fused together.

The handle assembly 16 also includes a second section 22 which is transversely disposed relative to the first section 17. Initially the second section has a substantially U-shape with a first member 23 subtending and supporting the pan bottom panel 12 and spanning same in a second direction. The first member 23 is disposed substantially equidistant from the handles 21 of the first section and is affixed to both of the wire segments 18a and 18b forming the base 18 of the first section. Connected to opposite ends of the first member and integral therewith are upwardly extending second members 24. The second members preferably diverge slightly from the first member and conform substantially to the vertical slant (3°-5°) of the side wall exterior surface. The second members are in proximity to opposite exterior surface portions of the pan side wall.

As aforementioned, the second members 24 are initially rectilinear and the upper end portion 24a of each second member pierces the pan rim 14 when the pan 11 is initially assembled with the handle assembly 16. As seen in FIG. 3, the pan 11 is first positioned above the handle assembly and aligned between the first segments 20 of the first section 17 and the upper end portions 24a of the second section 22. When the pan is so positioned, shown in phantom lines in FIG. 3, it is then moved downwardly, as shown by the arrows A, relative to the handle assembly, whereupon the tips T of the upper end portions 24a will pierce the pan rim adjacent the upper edge 13a of the side wall 13 and cause the upper portions 24a of the second members to project above the pan rim 14. Once the bottom panel 12 of the pan engages the first member 23 or base 18, each projecting upper end portion 24a is then offset outwardly and deformed into hooking engagement with an adjacent portion of the reinforcing bead 15, see FIGS. 5-7. Because the tips T pierce the pan rim, openings 25 are formed which are in proper alignment with the respective second member 24. If desired, however, the rim openings 25 may be preformed and reinforced by grommets, not shown, through which the upper end portions extend. The offsetting and deforming of the upper portions 24a may be readily effected automatically by suitable forming fixtures.

As seen in FIGS. 1, 3, 5 and 7 the portion 24b of each second member 24 which extends from the end of the first member 23 to the rim opening 25 is rectilinear and thus, simplifies and reduces the cost of forming the assembly. Furthermore, the rectilinear configuration facilitates nesting of a plurality of assemblies prior to being attached to the pan.

The lengths of the base 18 and first member 23 may vary from that shown and will depend upon the shape and size of the pan to be attached to the handle assembly. Thus, an improved disposable cooking utensil has been provided which is of simple and inexpensive construction and is capable of accommodating in stable manner a wide variety of food products. While the pan has been described as being of thin gauge metal foil, other materials may be utilized which have similar strength and heating characteristics but may be utilized in microwave ovens if desired. The handle assembly may also be formed of a suitable extruded microwavable material.

I claim:

1. A disposable cooking utensil comprising a pan of thin gauge material and a handle assembly, said pan including a bottom panel; an encompassing side wall connected to and extending upwardly from said bottom panel; a rim connected to and extending laterally outwardly from an upper edge of said side wall; and a reinforcing bead connected to and encompassing an outer edge of said rim; said handle assembly having a skeletal configuration and including a first section having an elongate base subtending and supporting said bottom panel, and side segments connected to opposite ends of said base and extending upwardly therefrom and in proximity to first exterior portions of said pan side wall, each side segment being provided with handle means adjacent said pan reinforcing bead and extending upwardly therefrom; and a second section having an elongate first member subtending and supporting said bottom panel and disposed transversely of and connected to the first section base, and opposing second members connected to opposite ends of said first member and extending upwardly therefrom and in proximity to second exterior portions of said pan side wall, each second member having an upper end portion extending through a rim opening interposed the bead and side wall upper edge, a segment of each upper end portion disposed above said rim opening being offset outwardly away from said upper edge and in substantial hooking engagement with said pan reinforcing bead.

2. The disposable cooking utensil of claim 1, wherein the handle assembly second section is disposed substantially equidistant from the first section side segments.

3. The disposable cooking utensil of claim 1 wherein each opening in the pan rim is formed by the second member upper end portion piercing the rim material prior to said end portion segment being offset outwardly into substantial hooking engagement with said reinforcing bead.

4. The disposable cooking utensil of claim 1, wherein the base of the first section includes a pair of spaced elongate elements substantially spanning in one direction the pan bottom panel.

5. The disposable cooking utensil of claim 4 wherein the spaced elongate elements are in substantially parallel relation.

6. The disposable cooking utensil of claim 4, wherein the elongate first member of the handle assembly second section substantially spans in a second direction the pan bottom panel and is connected to the elongate elements and retains the latter in said relatively spaced relation.

7. The disposable cooking utensil of claim 4 wherein the handle means of each side segment has an inverted substantially U-shape with depending legs connected to corresponding ends of the elongate elements of the first section base.

8. The disposable cooking utensil of claim 1 wherein the rim openings are disposed in close proximity to the side wall upper edge.

9. The disposable cooking utensil of claim 8 wherein each second member of the second section has a substantially rectilinear portion extending from an end of the first member to the rim opening.

* * * * *